Sept. 9, 1924.
W. H. CRAVEN
ICE CREAM DISHER
Filed June 6, 1923
1,507,698
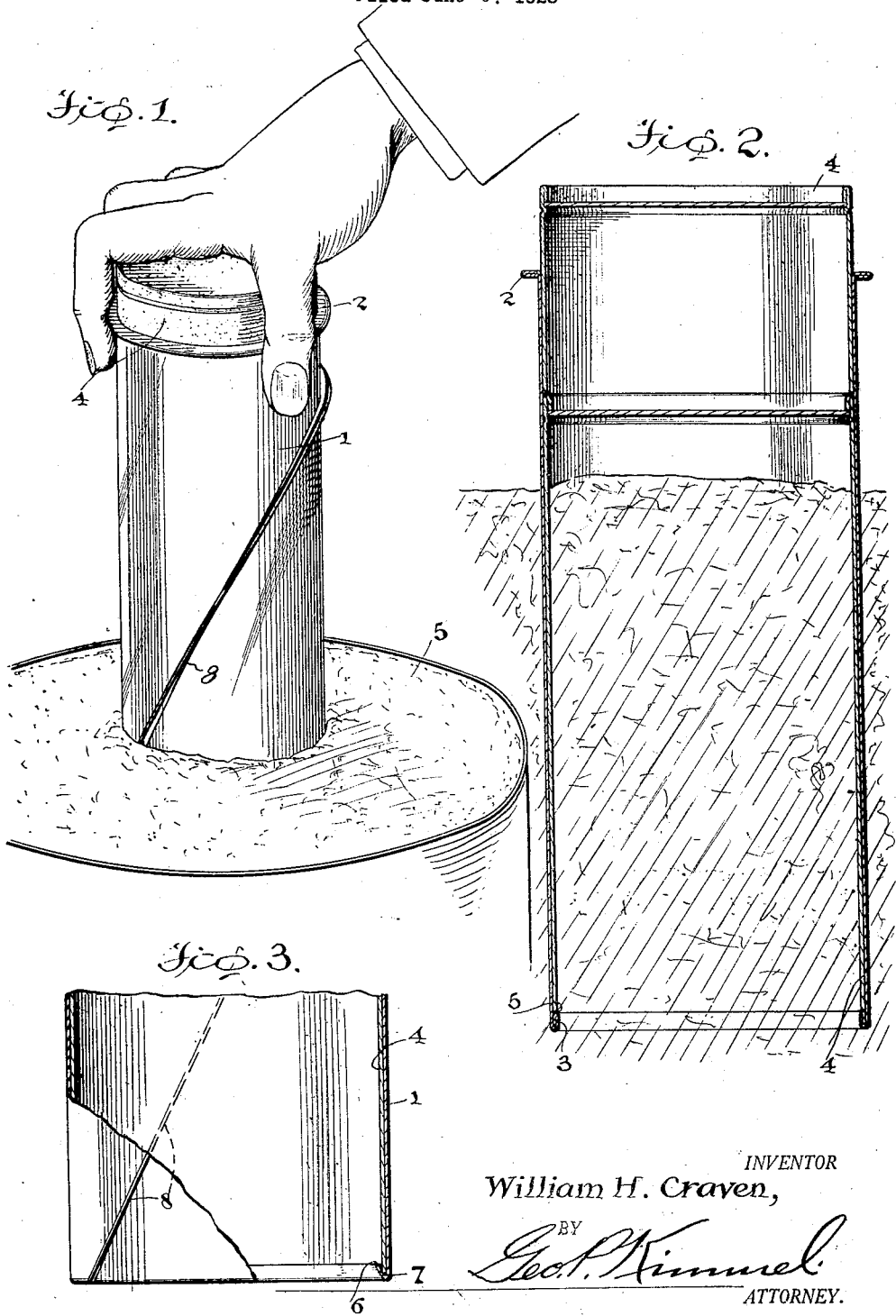
INVENTOR
William H. Craven,
BY
ATTORNEY.

Patented Sept. 9, 1924.

1,507,698

UNITED STATES PATENT OFFICE.

WILLIAM H. CRAVEN, OF PHILIPSBURG, PENNSYLVANIA.

ICE-CREAM DISHER.

Application filed June 6, 1923. Serial No. 643,667.

*To all whom it may concern:*

Be it known that I, WILLIAM H. CRAVEN, a citizen of the United States, residing at Philipsburg, in the county of Center and State of Pennsylvania, have invented certain new and useful Improvements in Ice-Cream Dishers, of which the following is a specification.

This invention relates to ice cream carton filling devices and has for its main object the provision of a holder, which, carrying the container therein may be thrust into the ice cream, forcing the cream directly thereinto, thereby eliminating the use of spoons or scoops to fill the container.

It is known that in the handling of ice cream in bulk, where the cream is transferred from the freezer to the carton by means of a spoon or scoop, considerable of the cream adheres to the spoon, and when the same is washed off this cream is lost, entailing in the final inventory, a great loss to the merchant. Another source of profit loss in handling bulk cream where scoops and spoons are used, is in the tendency of the dispenser to pack the carton, bulging the sides and thus giving more than the amount called for. This device eliminates both of these sources of loss to the merchant as the cream is forced directly into the container thus eliminating the use of spoon or scoop, and as the container is encased by the device it is impossible to force more into the container than it was intended to hold originally.

A clearer and better understanding of the device may be had upon reference to the accompanying drawing, in which;

Figure 1 is a perspective view showing the operation of the device.

Fig. 2 is a vertical transverse view of the device carrying two cartons of unequal size and, Fig. 3 is a detail sectional view of the lower end of the device showing a modification thereof.

In the drawings, where like numerals of reference indicate corresponding parts in each of the several views 1 indicates an elongated hollow cylindrical member open at either end, embodying the invention, which may be of metal or other suitable material, the upper edge of which is spread outwardly and turned back upon itself to form the annular flange 2. The lower edge is turned inwardly against the body of the cylinder to form the ledge 3, as shown.

This cylinder is of a diameter sufficient to allow a waxed paper bottle 4 of the type commonly used for the dispensing of ice cream, to be snugly positioned therein when the top has been removed therefrom, the open edge of said bottle resting upon the ledge 3, as shown at 5. The cylinder is of the same internal diameter throughout and snugly engages the peripheral surface of the bottle when it is placed therein. With the bottle in place in the cylinder the open end is pressed downwardly into the cream, indicated at 5, forcing the same up into the bottle, the inturned ledge 3, acting as a cutting edge and preventing the cream from working its way upward between the cylinder and the bottle. When the cylinder and bottle is withdrawn the cream will be evenly and firmly packed in the carton, the whole is then inverted allowing the filled carton to drop out at the flanged end, when it may be closed and dispensed.

As shown in Figure 2, the cylinder is made of sufficient length to take two cartons, of different length, the upper one extending slightly above the upper edge of the cylinder. When the hand is placed over the upper end, with the fingers grasping the flange 2, the lower carton is held firmly down against the ledge 3, keeping it in position while being forced into the cream. By forming the cylinder of a length greater than that of the longest bottle, the fingers of the dispenser will not come into contact with the cream, as would be the case were the cylinder of equal length with the carton.

In Figure 3, is shown a slight modification in the cylinder structure. Here the lower end is inturned and left at an angle as at 6, instead of being pressed back against the wall. A gutter is thus formed as at 7, into which the rim of the carton seats. On the outer surface of this cylinder a cutter blade 8, is provided. This blade will cause the cylinder to rotate slightly when being pressed downward into the cream, thus assisting the edge in cutting its way through the cream. This form will be particularly useful in dispensing cream which has frozen very hard.

Having thus described the invention, it is to be understood that the same is not confined to any strict conformity with the show- ing of the drawings, but may be changed and modified so long as such changes and modifications mark no material departure from the salient features of the invention as expressed in the appended claim.

What I claim is:

A carton filling device comprising a substantially elongated hollow cylindrical member open at each end and adapted to receive the carton to be filled and permanently of a length greater than the length of the carton, said member having a continuous outstanding flange at the outer end thereof and further provided at its inner end with a continuous inturned portion to provide an abutment for the edge at the open end of the carton, said inturned portion extending inwardly at an angle with respect to the wall of the cylinder and a cutting blade upon the outer surface of the cylinder extending from the lower to the upper edge and at an inclination thereof.

In testimony whereof, I affix my signature hereto.

WILLIAM H. CRAVEN.